United States Patent
Becker et al.

(10) Patent No.: US 6,764,054 B2
(45) Date of Patent: Jul. 20, 2004

(54) LOCKING DEVICE WITH GROOVED LOCKING PINS

(76) Inventors: Burkhard Becker, Obenkatternberg 25, 42657 Solingen (DE); Ernst-Reiner Frohnhaus, Nettelbeckstrasse 4, 42653 Solingen (DE); Klaus Kautzner, Dürerweg 12, 40724 Hilden (DE); Ulrich Karthaus, Tannenbergstrasse 3, 42699 Remscheid (DE)

( * ) Notice: Subject to any disclaimer, the term of this patent is extended or adjusted under 35 U.S.C. 154(b) by 0 days.

(21) Appl. No.: 10/305,495

(22) Filed: Nov. 26, 2002

(65) Prior Publication Data

US 2003/0150971 A1 Aug. 14, 2003

(30) Foreign Application Priority Data

Nov. 28, 2001 (DE) ........................... 101 57 774
Jan. 15, 2002 (DE) ........................... 102 01 153
Sep. 14, 2002 (DE) ........................... 102 42 825

(51) Int. Cl.[7] ................................. F16M 13/00
(52) U.S. Cl. ........................ 248/429; 248/424
(58) Field of Search ................. 248/424, 430, 248/429, 548, 900; 297/216.15, 216.16, 216.18, 216.1

(56) References Cited

U.S. PATENT DOCUMENTS

| 4,189,957 A |   | 2/1980  | Gedig et al. |           |
|-------------|---|---------|--------------|-----------|
| 4,832,409 A | * | 5/1989  | Borlinghaus et al. | 297/468 |
| 5,046,698 A | * | 9/1991  | Venier | 248/430 |
| 5,125,611 A | * | 6/1992  | Cox | 248/429 |
| 5,353,930 A | * | 10/1994 | Berry, Jr. | 206/370 |
| 5,816,110 A | * | 10/1998 | Schuler et al. | 74/527 |
| 5,913,947 A |   | 6/1999  | Groche |  |
| 5,918,846 A | * | 7/1999  | Garrido | 248/429 |
| 6,113,051 A | * | 9/2000  | Moradell et al. | 248/430 |
| 6,308,589 B1 |  | 10/2001 | Schuler et al. |  |
| 6,352,312 B1 | * | 3/2002 | Rees | 297/470 |

FOREIGN PATENT DOCUMENTS

| DE | 297 00 866 U1 | 4/1997 |
| DE | 197 09 149 A1 | 9/1998 |
| DE | 299 10 720 U1 | 9/1999 |
| EP | 0 408 932 A2  | 1/1991 |

* cited by examiner

*Primary Examiner*—Leslie A. Braun
*Assistant Examiner*—Kofi Schulterbrandt
(74) *Attorney, Agent, or Firm*—Akerman Senterfitt

(57) ABSTRACT

A locking device of a longitudinal adjustment device of a vehicle seat is provided with a catch bar with periodically arranged snap openings and snap studs that is assigned to a bottom rail of the longitudinal adjustment device and is further provided with a locking unit assigned to a seat rail of the longitudinal adjustment device. The locking device has at least two locking pins that can be inserted into the snap openings independent of one another, they can be disengaged only jointly. The locking pins are arranged in a guide member which has a pin bore for each locking pin. The snap pins are provided with a grooved region consisting of at least one individual groove. Said grooved region is located in proximity to the lower end of the corresponding pin bore when the locking pin is engaged in a snap opening.

3 Claims, 4 Drawing Sheets

LOCKING DEVICE WITH GROOVED LOCKING PINS

FIELD OF THE INVENTION

The invention relates to a locking device of a longitudinal, i.e. lengthwise adjustment device of a vehicle seat. The locking device is provided, on the one side, with a catch bar having periodically alternating snap openings and snap studs. The catch bar is assigned to a bottom rail of the longitudinal adjustment device. On the other side, the locking device is provided with a locking unit assigned to a seat rail of the longitudinal adjustment device. The locking unit has at least two locking pins that can be inserted into snap openings independent of one another and can jointly be retracted therefrom. The locking pins are arranged in a guide member having a pin bore for each locking pin.

DESCRIPTION OF PRIOR ART

Such a locking device has been previously proposed in DE 197 09 149 A. Further relevant prior art is also described in EP 408 932 B and DE 27 29 770 C. This type of looking device is also termed a multiple pin locking device. These devices permit a fine pitched and sensitive longitudinal adjustment. In the locked position, a lacking pin fits beside a snap stud. Usually, it is a sloping side of the locking pin that fits beside a snap stud. The sloping sides are formed by truncated regions on the free end of the locking pins for example. A locking pin locks in one direction of displacement. Another locking pin looks in the other direction of displacement.

Since generally but one locking pin is responsible for locking one direction of displacement, under crash load all of the locking forces act onto that one locking pin and onto the corresponding snap stud on which the locking pin is resting. Under high load conditions, the corresponding forces intentionally cause the locking pin to bend, as has already been described in DE 197 09 149 A mentioned herein above. Now, if a locking pin bends, the angle between the locking flank thereof and the snap stud changes. The angle increases. Before, it was within the range of self-locking, but after bending, it may be outside of this range. If it is outside of this range, said forces exerted onto the locking pin can push the locking pin upward, meaning out of the locking condition. The locking pin must however be prevented from disengaging from the corresponding snap stud in order not to release the locking state.

SUMMARY OF THE INVENTION

This is where the invention comes to bear. The object of the invention is to further develop the locking device of the type mentioned herein above in such a manner that the locking pins are prevented from being pushed upward out of a locking position in an accident situation.

In view of the locking device of the type mentioned herein above, the solution to this object is to provide at least one of the snap pins with a grooved region and to locate said grooved region in proximity to a lower end of the corresponding pin bore when the snap pin is engaged in one of the snap openings.

At least one of the locking pins, preferably all of the locking pins, have a grooved region which is also termed crash groove or fluting. Several individual grooves may be located in the region of this crash groove. Preferably, three to five individual grooves are provided. In the region of the grooves, the locking pin is tapered, preferably slightly tapered, e.g., by between 5 and 15%, preferably by about 8%. Moreover, toward the free end of the locking pin, the crash groove preferably has a sharp-edged transition where it more specifically forms an edge or a stop face.

The fluting formed by one or several individual grooves efficiently prevents the locking pin from being pushed upward out of its locking position in an impulse-like or in a slow manner. As soon as the locking pin is slightly bent in the event of an accident, the one individual groove, or the several individual grooves, provide many possibilities for interlocked and clutched engagement. Several individual grooves that may interact with the material of the guide member at the lower end of the pin bore are preferably available so that the locking pin is prevented from moving upward.

The fluting also slightly weakens locally the locking pins so that these preferably warp in the region of the fluting. This is where the locking pins also offer the largest area for abutment on the region about the lower end of the pin bore.

The reduction in the diameter of the locking pins in the region of the fluting is chosen, on the one side, to be great enough, so that the stop face provided is great enough to provide a good mechanical interlock and, on the other side, is chosen not so great that the locking pin is markedly weakened and risks to break in the region of the fluting in the event of an accident. What is wanted is a selective deformation in the region of the fluting.

In a preferred development of the invention, the guide member has a projection pointing downward, i.e., toward the catch bar, for each pin bore. The projections extend as a continuation of the respective one of the pin bores. The projections are preferably annular. They allow for softer and more flexible guidance of the locking pins than in the region of the pin bore of the guide member. They offer less resistance than the guide member to outward lateral bending. Under crash load, the projections may be bent. As a result thereof, the interlocked engagement with the fluting is enhanced.

In an improved embodiment of the invention it is suggested to configure the projections to form rimmed holes. For this purpose, one pilot hole for each pin bore is first made in the guide member, said pilot hole having a diameter which is considerably smaller than that of the completed pin bore and amounts to 60% of the diameter of the completed pin bore for example. Now, the pilot hole is enlarged by means of a punch the outer dimensions of which correspond to the pin bore, a respective projection being formed in the process. The projections are connected to, and integral with, the guide member. In another embodiment, the projections may be realized by separately inserting a material, such as slide bushes for example.

It proved particularly advantageous to provide a bead in the catch bar, said bead being curved upward toward the guide member. As a result thereof, the catch bar is mechanically reinforced and the stability of a locking condition increased. The bead may comprise any cross section, such as semi-circular, triangular or trapezoidal, and so on.

In a preferred embodiment, three or four almost evenly spaced individual grooves are provided side by side. The individual grooves preferably have a truncated bottom that tapers toward the free end of the locking pin. At their free ends, the locking pins advantageously have a short, cylindrical front end.

It finally proved advantageous to configure the locking pins to have a round shape, but the pin bores to have a non round shape. This more specifically applies to the region of the projections. Under a defined load, the material about the pin bore, and more specifically the projections, may plastically deform. As a result thereof, the edges of the individual grooves are allowed to better engage into the projection.

Further advantages and characteristics of the invention will become apparent in the other claims and in the following non restrictive description of embodiments given by way of example only with reference to the drawing.

DESCRIPTION OF THE PREFERRED EMBODIMENTS

Figure 1:
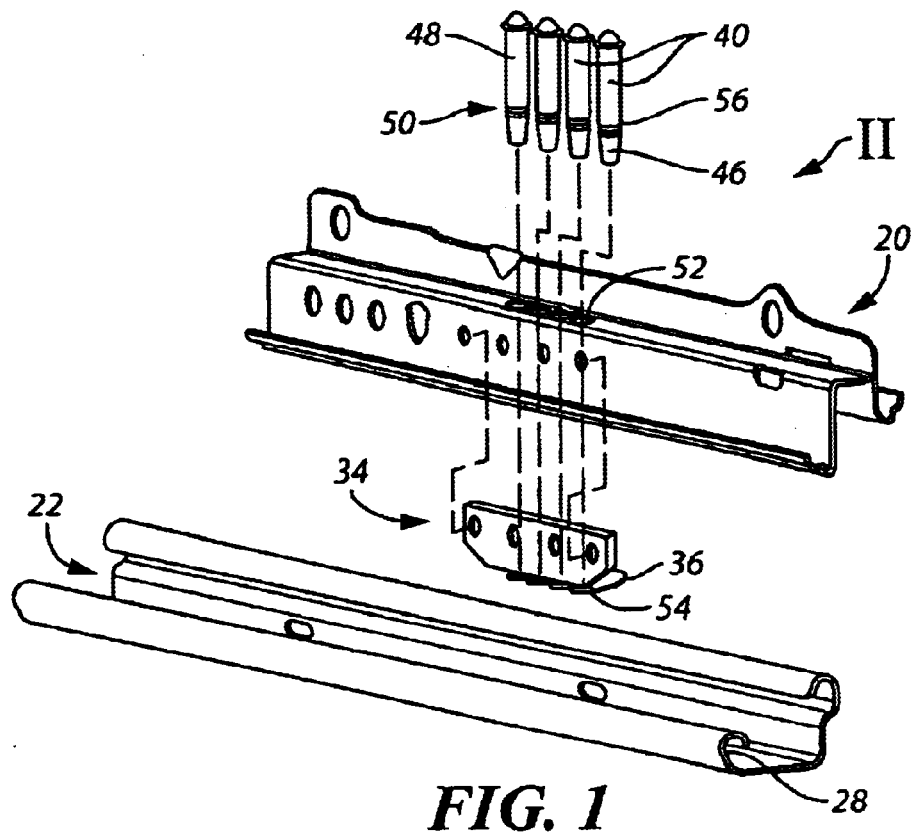
FIG. 1 is a perspective assembly drawing of a longitudinal guide with seat rail and bottom rail, a locking unit with four locking pins and one guide member being allocated thereto.

The first exemplary embodiment according to the FIGS. 1 through 4 is described herein after. Then, the other exemplary embodiments will be described as far as they differ from the first embodiment. The FIGS. 1 through 3 each depict one couple of rails consisting of a seat rail 20 and a corresponding bottom rail 22. The rails are relatively slidable by way of suited sliding or rolling means configured as balls 24 (see FIG. 3). As may be more specifically surveyed from FIG. 3, the seat rail 20 consists of two assembled individual sections. The two rails 20, 22 form the boundary of an elongate hollow space 26. The lower leg of bottom rail 22 is configured as a catch bar 28 extending in the longitudinal direction of the rail. Said catch bar 28 has periodically arranged snap openings 30, also termed windows, and snap studs 32. As more specifically shown in the FIGS. 2 and 3, the catch bar 28 is located in an upward bent bead 29. At the summit of the bead 29, the material of the lower flange of the bottom rail is bent upward by about 1.5 to 2 mm. The width of bead 29 approximately corresponds to the width of catch bar 28. The offset formed by bead 29 may be surveyed more specifically from FIG. 2. The catch bar 28 is reinforced by the bead 29.

An L-shaped angular section 34 is located in the hollow space 26, the vertical leg of the L of said angular section being fastened to the inner face of a vertical flange of seat rail 20. A free leg of said angular section 34 forms a guide member 36. Four pin bores 38 are provided therein. Each pin bore 38 receives a locking pin 40 which, in the exemplary embodiment shown, is rotationally symmetrical. The locking pins 40 are all built according to the same principle. Non round pins, e.g., such with a square cross section, are possible. In the case of non round pins, it is not necessary to form a peripheral groove. A notch provided on the side face located at the front viewed in the longitudinal direction of seat rail 20 will suffice (see FIG. 8).

The lacking pins are individually biased by a spring 42 into a locking position and may be jointly pulled into the release position by way of a release member 44. This needs not be discussed in detail, the reader is referred to the already mentioned EP 408 932 B.

As shown in the Figs., the locking pins 40 are slightly longer than the height of the hollow space 46. With their upper actuation region, they always remain outside of the seat rail 20 and, in the locked condition, their free end engages into a snap opening 30.

In the first embodiment, the lower, free end of the locking pins 40 is formed by a truncated region 46. At the upper end thereof, it turns into a cylindrical region 48. This region however is interrupted, just above where it begins, by a grooved region 50, also termed a crash groove or a fluting. There, the cylindrical region 48 is tapered by several spaced apart individual grooves 56. At its lower end, which is located nearer the catch bar 28 than its other end, each individual groove 56 more specifically has a sharp-edged transition to the intact cylindrical region 48. This will also become apparent in the other exemplary embodiments.

The locking pins 40 are moreover guided in holes 52 in an upper leg of seat rail 20. Said holes are located from the guide member 36 at a distance that is considerably greater than half the length of the locking pins. Generally speaking, this results in the locking pins 40 being efficiently supported over a great distance, a large lever arm being thus created.

Beneath each pin bore there is a projection 54 that extends downward as a continuation of the pin bore. It is preferably configured to form a rimmed hole, which will be discussed later, any configuration is possible in principle, though. It is connected to, and integral with, the remaining portion of the guide member 36 and is formed in the material thereof. In the axial direction, its length corresponds to about 60% of the material thickness of the guide member 36. In the radial direction, the annular projections 54 are relatively thin, their material thickness ranges from 1 to 3 mm. Preferably, the projections 54 have a sharp edge at their lower, free end. The projections 54 are preferably hardened, e.g., case hardened.

If the projections 54 are configured as rimmed holes in the embodiment of preference, the process is as follows: at first, pilot holes are drilled at the location of the future pin bores 38, said pilot holes having for example approximately 60% of the diameter of the future pin bores 38. Then, a tool, more specifically a pin, is driven through the pilot hole to enlarge said pilot hole until it meets the size of the pin bore 38, said pin forming, as it exits, the projection 54 together with that portion of pin bore 38 extended as a continuation by said projection.

To provide the clutched engagement in accordance with the invention, that portion of the projection is substantially needed that, viewed from the center of a pin bore 38, is located in the longitudinal direction of the rails 20, 22. In the transverse direction, the projection may be flatter or be dispensed with altogether.

Figure 2:
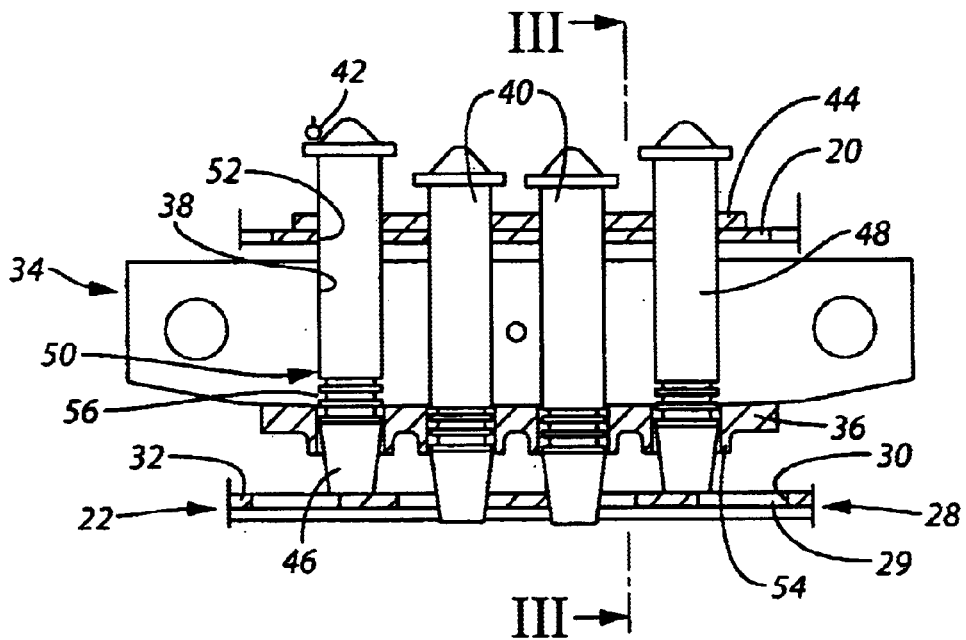
FIG. 2 is a rear side of the arrangement depicted in FIG. 1, viewed in the direction indicated by the arrow II in FIG. 1, this time in the assembled and engaged condition.
Figure 3:
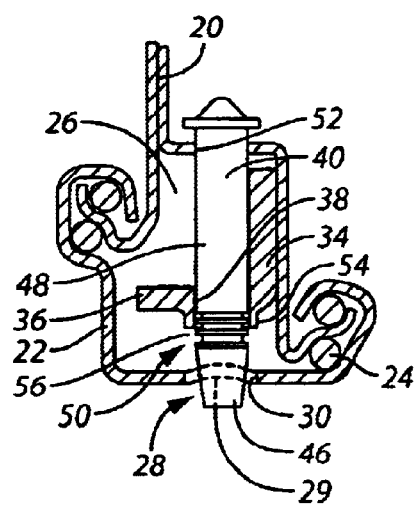
FIG. 3 is a sectional view taken along line III—III of FIG. 2.
Figure 4:
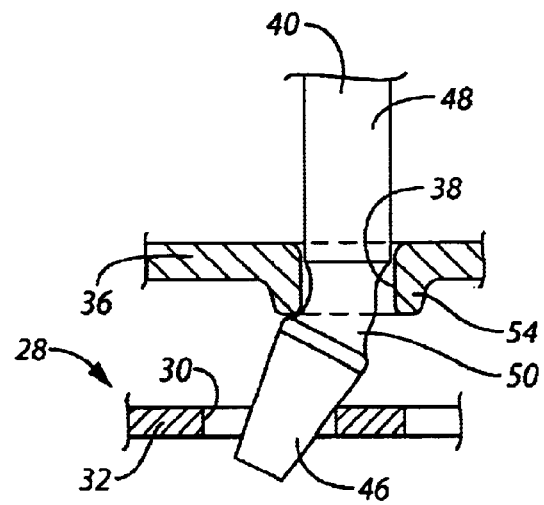
FIG. 4 is a detail shown in a view similar to FIG. 2 of an engaged locking pin bent after a crash to explain the clutch effect.

As more specifically depicted in the FIGS. 2 to 4, the grooved region 50 for those locking pins which are engaged is located in proximity to, and preferably slightly beneath, the lower end of the pin bore 38. It is located in proximity to the corresponding projection 54 and in the region thereof.

As a result thereof, when, in the event of an accident, the locking pin 40 is pushed upward and additionally warped (see FIG. 4), a lower edge of an individual groove 56 abuts on the neighboring edge of projection 54 in the warp direction. This allows for the desired interlock in an accident condition. The lower boundary of each individual groove 56 is preferably edged or is oriented approximately at right angles with the axis of the pin. The greatest possible stop face is thus achieved, which prevents the locking pin 40 from bouncing upward.

The projections 54 are located on the lower face of guide member 36 and in proximity to the snap stud 32. The spacing between guide member 36 and snap stud 32 is slightly smaller than the axial length of the truncated region 46.

The guide member 36 is made of a steel with a yield point value of 260 N/mm². The locking pins 40 are also made of steel, but of a steel having a much higher yield point, of 600 N/mm² for example. The material thickness of the guide member 36 is approximately 3.5 mm. The projections protrude approximately 2 mm downward and have a wall thickness of about 1.5 mm. The projections 54 make the pin guidance softer and longer. In their cylindrical region 48, the locking pins 40 have a diameter of about 7.5 mm. The pin bore 38 is a hole with an inner diameter of about 7.8 mm. The rails 20, 22 are made of a very hard steel, the yield point of which is even higher than that of the material of which the locking pins 40 are made. In the region of crash groove 50, the diameter of the locking pins tapers to about 6.9 mm. The axial length of groove 50 is slightly smaller than the axial length of the complete pin bore 38, i.e., in the guide member 36 and in the projection 54. It may also be greater than the axial length of pin bore 38.

Figure 5:
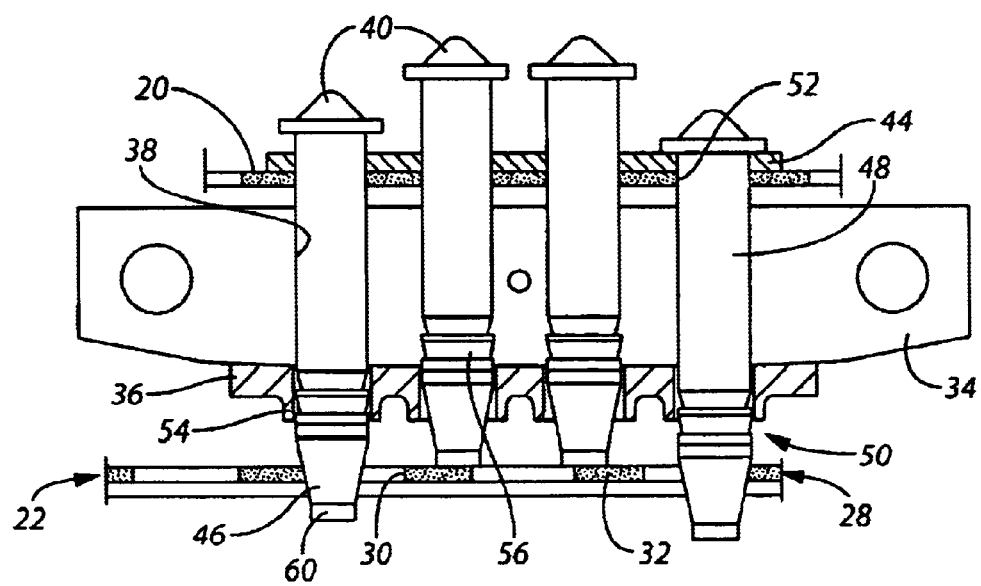
FIG. 5 is a side view according to FIG. 2 of another exemplary embodiment of a locking unit.

In the embodiment according to FIG. 5, either individual groove 56 is configured in such a manner that its bottom conically tapers from the top toward the free end of the locking pin. A sharp edge is thus formed in the lower end region. In FIG. 5, the far right locking pin 40 is fully snapped in, it cannot be engaged any further. This Fig. shows that, although the lower edge of projection 54 is located at the same height as the grooved region 50, it is located some millimeters above the lower sharp-edged border of the lower individual groove 56. The two central locking pins 40 are disengaged, the grooved region 50 is situated almost entirely above guide member 36. The far left locking pin 40 is engaged, but not completely lowered so that possible play may still be compensated for. Here, the lower border of the grooved region 50 is located at approximately the same height, even slightly above the lower edge of projection 54. On account of the point contact between the lower border of the grooved region 50 and projection 54, the achievable interlock is still sufficient even in this condition in the event of a bending occasioned by an accident.

Figure 6:
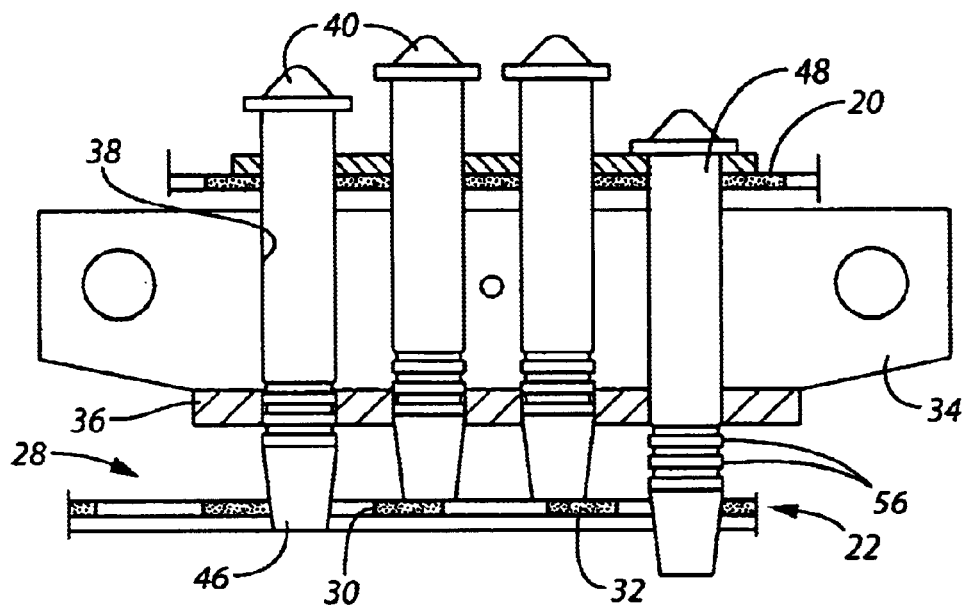
FIG. 6 is an embodiment similar to FIG. 5, with the locking pins provided with three individual grooves forming together the crash groove.

FIG. 6 depicts a configuration similar to that in FIG. 5, except for the grooved region 50 which is now formed by the arrangement of three individual grooves 56 and for the projection, which has been dispensed with. Between the individual grooves 56, the locking pin 40 has again the diameter of the cylindrical region 48. As a result thereof, the guidance of the locking pin 40 within pin bore 38 is enhanced. The axial length of this intermediate region approximately corresponds to the axial length of the individual grooves 56. The several individual grooves 56, with their increased number of lower groove edges, provide more options for interaction with the lower border of guide member 36. The three individual grooves 56 extend over 50–90%, more specifically over 70% of the maximum distance the locking pins 40 are capable of travelling. The length of the maximum travel also substantially corresponds to the axial length of the truncated region 46.

The individual grooves have an axial measurement of e.g., 2 to 4 mm. An intact region with a full cross section of approximately 0.1 to 3 mm in axial dimension remains between two individual grooves.

Figure 7:
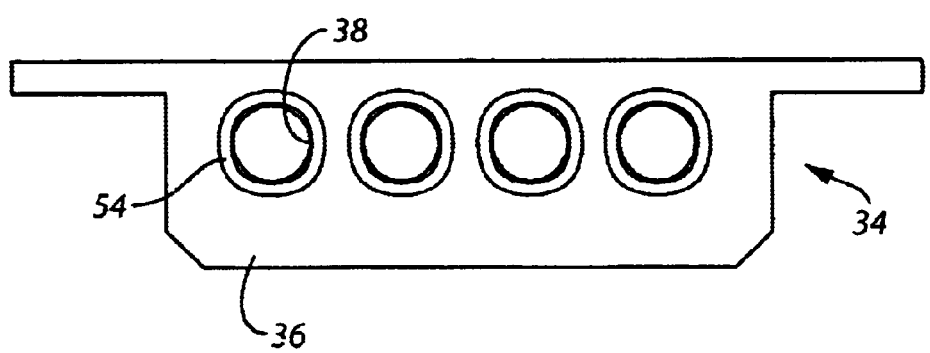
FIG. 7 is a bottom view of a guide member with a non round pin bore and with non round contours in the region of the projections, the guide member being part of an L-shaped angular section

FIG. 6 shows an embodiment of an angular section 34 in which the pin bores 38 are non round. By contrast, the locking pins 40 are round. In fact, the cross sections of the pin bore 38 in FIG. 7 are approximately cushion-shaped, approximating the shape of a square with rounded corners. As a result thereof, there is still enough guide area on the one side. On the other side, plastic deformation is allowed to take place in the region around the pin bore 38. Said plastic deformation occurs under a defined load, as it is encountered in an accident situation. The groove edges are allowed to better engage.

Figure 8:
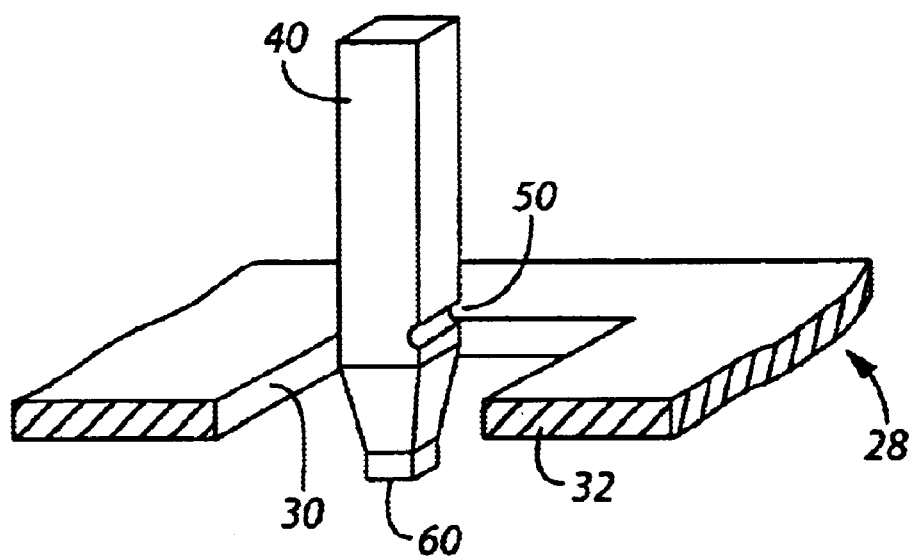
FIG. 8 is a perspective view of a locking pin with a square cross section and a catch bar.

Finally, FIG. 8 depicts a non round locking pin 40 which, in the exemplary embodiment, has a square cross section. Due to its non round cross section, the locking pin 40 has a predetermined orientation. At its lower free end, it tapers to a front end 60. It only has a groove 50 on one of its four side faces, no grooves are provided on the other side faces. For a passenger seated in the direction of travel, the groove is at the front in the direction of travel. It is oriented in the longitudinal direction of the rails and is directed toward the front in the longitudinal direction of the rails. A groove may also be provided on the opposite side face for rear collision.

What is claimed is:

1. A locking device of a longitudinal adjustment device of a vehicle seat, said longitudinal adjustment device having a seat rail and a bottom rail, said locking device comprising:

a catch bar with periodically arranged snap openings and snap studs said catch bar being assigned to the bottom rail of the longitudinal adjustment device a looking unit assigned to the seat rail of the longitudinal adjustment device and provided with at least two locking pins which locking pins can be inserted into the snap openings independent of one another and can only jointly be disengaged from the snap openings, said locking pins being arranged in a guide member of the locking unit said guide member having a pin bore for each locking pin, wherein at least one of the locking pins is provided with a grooved region and said grooved region is located in proximity to a lower end of the corresponding pin bore when the locking pin is engaged in one of the snap openings, and wherein the guide member has a material thickness of two to five mm, and is made of steel, wherein the locking pins are made of steel as well and the material of the guide member has a lower yield point than the material of the pins.

2. The locking device according to claim 1, wherein the material of the guide member has a yield point amounting to half of that of the material of the pins.

3. The locking device according to claim 1, wherein the guide member has a material thickness of three to four mm.

* * * * *